United States Patent
Kumar et al.

(10) Patent No.: US 10,007,319 B2
(45) Date of Patent: Jun. 26, 2018

(54) POWER SAVING IN MULTI-DIRECTIONAL DATA TRANSFER

(71) Applicant: PMC-SIERRA US, INC., Sunnyvale, CA (US)

(72) Inventors: Amrendra Kumar, Bangalore (IN); Janardan Prasad, Burnaby (CA); David Joseph Clinton, Coopersburg, PA (US)

(73) Assignee: Microsemi Solutions (U.S.), Inc., Aliso Viejo, CA (US)

( * ) Notice: Subject to any disclaimer, the term of this patent is extended or adjusted under 35 U.S.C. 154(b) by 233 days.

(21) Appl. No.: 14/972,246

(22) Filed: Dec. 17, 2015

(65) Prior Publication Data
US 2017/0177061 A1    Jun. 22, 2017

(51) Int. Cl.
*G06F 1/32* (2006.01)
*G06F 3/06* (2006.01)

(52) U.S. Cl.
CPC .......... *G06F 1/3225* (2013.01); *G06F 1/3206* (2013.01); *G06F 1/3253* (2013.01); *G06F 1/3275* (2013.01); *G06F 1/3287* (2013.01); *G06F 3/0625* (2013.01); *Y02D 10/13* (2018.01); *Y02D 10/14* (2018.01); *Y02D 10/151* (2018.01)

(58) Field of Classification Search
None
See application file for complete search history.

(56) References Cited

U.S. PATENT DOCUMENTS

| | | | |
|---|---|---|---|
| 7,386,661 B2 | 6/2008 | Perozo et al. | |
| 7,475,265 B2 | 1/2009 | Oshikawa et al. | |
| 8,271,700 B1 | 9/2012 | Annem et al. | |
| 9,189,050 B1 | 11/2015 | Greenberg | |
| 9,877,285 B2* | 1/2018 | Gupta | H04W 52/0251 |
| 2003/0163742 A1 | 8/2003 | Lam | |
| 2006/0112221 A1* | 5/2006 | Hu | G06F 11/3476 711/114 |
| 2008/0005463 A1* | 1/2008 | DeCenzo | G06F 3/0613 711/113 |

(Continued)

FOREIGN PATENT DOCUMENTS

WO     2013081597 A1    6/2013

OTHER PUBLICATIONS

International Patent Application No. PCT/US2016/087187, International Search Report and Written Opinion dated Jun. 13, 2017.

*Primary Examiner* — Jaweed A Abbaszadeh
*Assistant Examiner* — Cheri Harrington
(74) *Attorney, Agent, or Firm* — Leber IP Law; Dennis R. Haszko

(57) ABSTRACT

A power-saving method and circuit in a data processing device comprising a data buffer. Data transfer commands associated with a data source and a data destination are received at the data processing device. The data transfer commands are accumulated until an amount of data associated with the read commands is greater than a predefined threshold. When the amount of data is less than the predefined threshold and the data buffer is empty, the data buffer is signaled to enter or to maintain a power saving mode. When the amount of data is at least the predefined threshold, the data buffer is signaled to exit the power saving mode following a predetermined delay. Processing of the commands and data in respective pipelines is monitored to time exiting of the buffer from the power saving mode for arrival of the data. Power saving mode use and thus power saving are optimized.

26 Claims, 5 Drawing Sheets

(56) References Cited

U.S. PATENT DOCUMENTS

| | | |
|---|---|---|
| 2008/0126713 A1 | 5/2008 | Lin et al. |
| 2010/0235663 A1* | 9/2010 | Olsson .................... H04L 12/12 713/323 |
| 2011/0239256 A1* | 9/2011 | Gholmieh ........... H04W 72/005 725/62 |
| 2011/0300858 A1* | 12/2011 | Lee ........................ H04W 8/24 455/425 |
| 2011/0302339 A1 | 12/2011 | Umezawa |
| 2012/0089851 A1* | 4/2012 | Ting ...................... G06F 1/3206 713/310 |
| 2012/0221767 A1* | 8/2012 | Post .................... G06F 13/1673 711/103 |
| 2013/0159567 A1* | 6/2013 | Gallagher ............. G06F 1/3234 710/52 |
| 2013/0243007 A1* | 9/2013 | Ding ....................... H04L 47/58 370/412 |
| 2013/0259063 A1* | 10/2013 | Thottan ............... H04L 49/9005 370/419 |
| 2013/0311797 A1 | 11/2013 | Ahmad et al. |
| 2014/0015567 A1 | 1/2014 | Kadosh et al. |
| 2014/0310549 A1* | 10/2014 | Herbeck ................. G06F 1/324 713/322 |
| 2015/0155050 A1* | 6/2015 | Trantham ........... G11C 16/3418 365/185.03 |
| 2015/0241952 A1 | 8/2015 | Asami et al. |
| 2016/0291884 A1* | 10/2016 | Halaharivi ............ G06F 3/0613 |
| 2017/0068480 A1* | 3/2017 | Huang ................. G06F 3/0625 |
| 2017/0139593 A1* | 5/2017 | Tan ......................... G06F 3/061 |
| 2017/0322614 A1* | 11/2017 | Holland ................ G06F 1/3265 |
| 2017/0357483 A1* | 12/2017 | Nicol ...................... G06F 5/085 |

\* cited by examiner

POWER SAVING IN MULTI-DIRECTIONAL DATA TRANSFER

FIELD

The present disclosure relates to power saving in multi-directional data transfer circuits.

BACKGROUND

Multi-directional data transfer is a data transfer technique in which data sources transfer data to multiple destinations. Examples of the sources and the destinations include storage disks, servers, and memory controllers. A single source multi-directional data transfer system is a type of multi-directional data transfer system in which a single source transfers data to multiple destinations. An example of a single source multi-directional data transfer is a data transfer from a storage disk to a server and to a memory controller. Single source multi-directional data transfer is used in applications which support a large number of interfaces and a large amount of performance and latency variations in the interfaces across different protocols. One such application is RAID-on-chip (RoC).

Multi-directional data transfer circuits conventionally utilize one or more buffers in each direction of data transfer to provide data to the destination from the source. The one or more buffers may be random access memory (RAM). The RAM used in typical chips, such as telecommunication chips and storage chips, involve significant leakage power. The leakage power may sometimes contribute at least 20-30% of total power consumption in the chips. The power consumed by RAM in the chips presents a significant disadvantage and thus needs to be addressed.

Current RAMs often provide multiple power saving modes which reduce the voltage to parts of the RAM. The RAM in a power saving mode consumes less power than it does when it is working actively, i.e., when it is in an active mode. In principle, utilization of the power saving modes in the RAM used in the multi-directional data transfer may lead to a decrease in power consumption of the multi-directional data transfer. In conventional methods, however, frequent transition of the RAM into and out of the power saving modes may lead instead to an increase in power consumption.

It is advantageous in general to provide improved power savings in data processing circuits generally, and multi-directional data transfer circuits specifically, and therefore there is an ongoing need for improved multi-directional data transfer techniques which enable decreased power consumption.

BRIEF DESCRIPTION OF THE DRAWINGS

The following detailed description references the drawings, as follows.

DETAILED DESCRIPTION

An improved technique for operating a multi-directional data transfer circuit is described herein. The multi-directional data transfer circuit operates to transfer data from multiple data sources to multiple destinations. Examples of the sources and the destinations include, but are not limited to, storage disks, servers, and memory controllers.

In some embodiments the circuit is a single source multi-directional data transfer circuit which operates to transfer data from a single source to multiple destinations. A non-limiting example of a single source multi-directional data transfer is a data transfer from a storage disk to a server and to a memory controller. Single source multi-directional data transfer is used in applications such as, RAID-on-chip (RoC), which support a large number of interfaces and a large amount of performance and latency variations in the interfaces across different protocols. The interfaces may include, but are not limited to, Double Data Rate (DDR), Peripheral Component Interconnect express (PCIe), Serial Attached Small Computer System Interface (SCSI), Serial AT Attachment (SATA), Random Access Memory (RAM), and Magnetoresistive RAM (MRAM). The protocols may include, but are not limited to, protocols followed by the interfaces, such as Advanced Microcontroller Bus Architecture (AMBA) and Advanced eXtensible Interface (AXI).

The multi-directional data transfer circuit uses one or more buffers, which may include one or more buffers in each direction of data transfer, to provide data to the destination from the source. The one or more buffers may be RAM. The RAM has at least one power saving mode which enables the RAM to consume less power than in an operational, or active, mode. In some embodiments, the RAM has multiple power saving modes, which may include a light sleep mode, a deep sleep mode, and a power gating mode.

Figure 1:
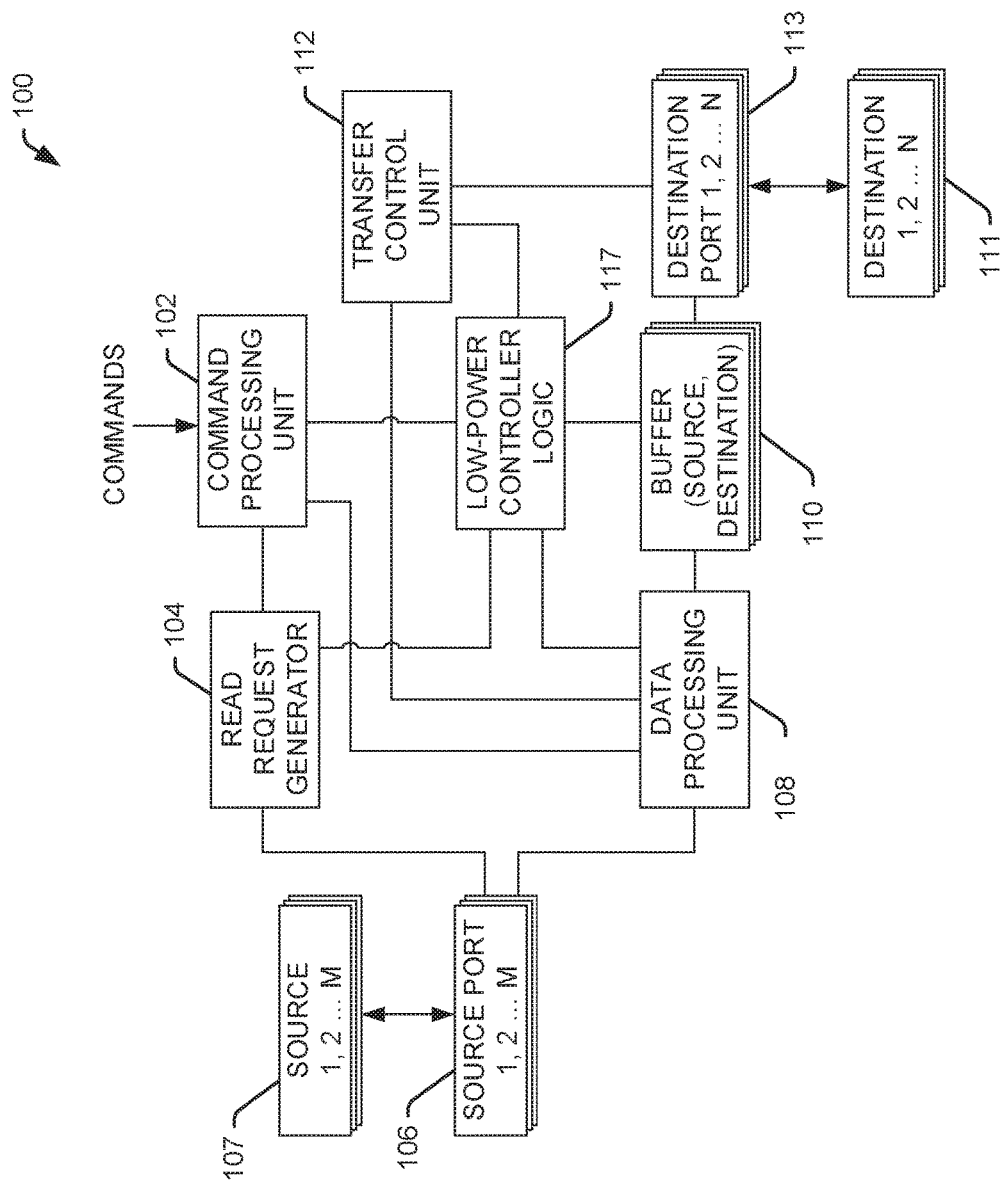
FIG. 1 is a block diagram illustrating a multiple source multi-directional data transfer circuit.

FIG. 1 illustrates a multi-directional data transfer circuit 100 which interfaces multiple sources 1, 2 . . . M 107 via corresponding source ports 1, 2 . . . M 106, and multiple destinations 1, 2 . . . N 111 via corresponding destination ports 1, 2 . . . N 113. The data transfer circuit 100 has a command processing unit 102, a read request generator 104, a data processing unit 108, and a transfer control unit 112. The data transfer circuit 100 also has a number of buffers 110, and may include a unique buffer 110 for each combination of one of the sources 107 and one of the destinations 111 (or, correspondingly, each combination of one of the source ports 106 and one of the destination ports 113). The circuit 100 also has a low-power controller logic 117. The command processing unit 102, the read request generator 104, the data processing unit 108, and the buffers 110 may be provided in a chip, such as RoC.

Figure 2:
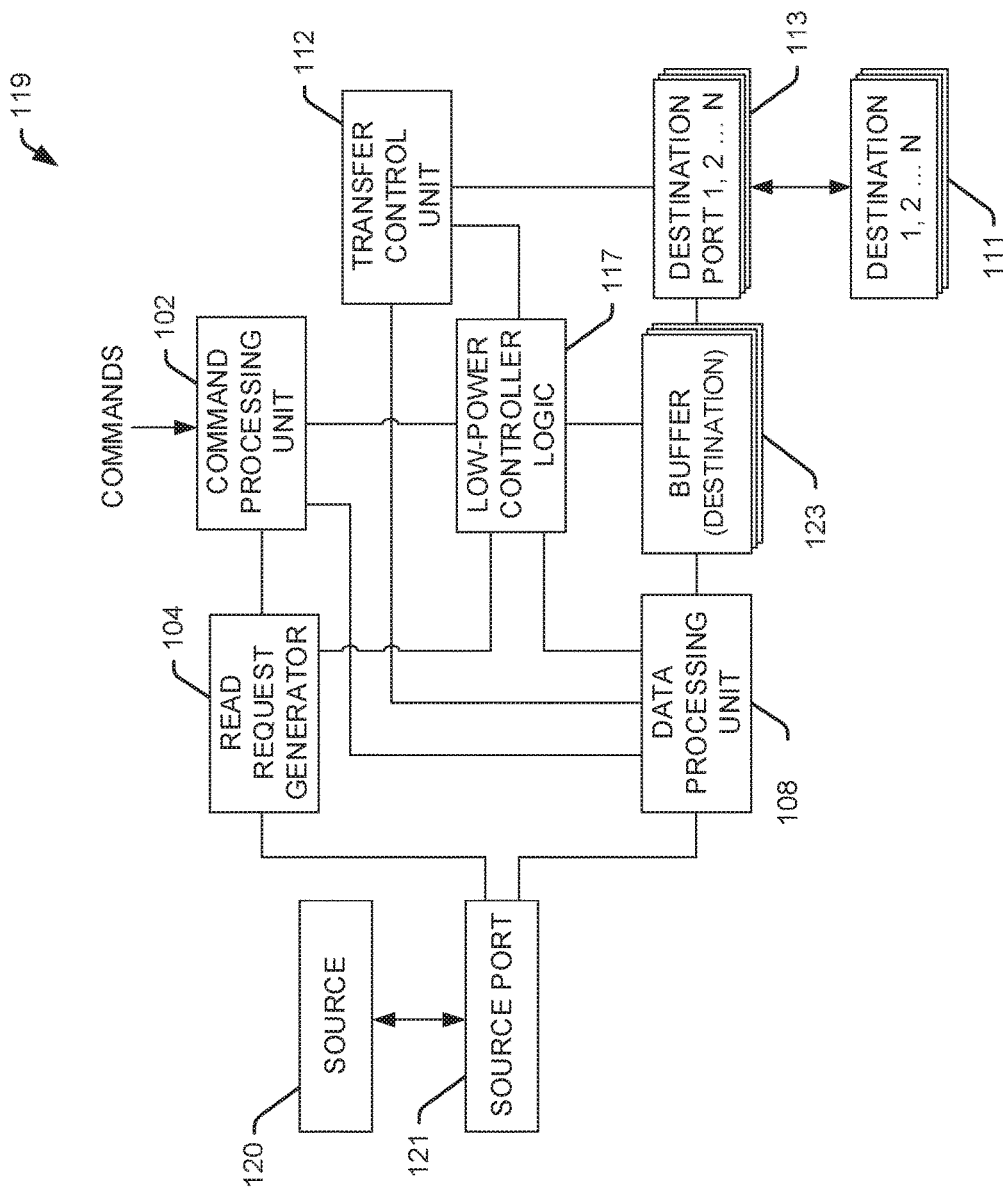
FIG. 2 is a block diagram illustrating a single source multi-directional data transfer circuit.

As noted above, in some embodiments the multi-directional data transfer circuit 100 is a single source multi-directional data transfer circuit 119, as shown in FIG. 2, which is identical to multi-directional data transfer circuit 100 except in that it interfaces a single source 120 via a single source port 121, which are instances of sources 107 and source ports 106, respectively, and has a unique buffer 123 corresponding to each destination 111, wherein buffers 123 are instances of buffers 110. Thus, in embodiments where the sources 107 comprise a single source 120 accessed via a corresponding single source port 121, each one of the buffers 123 corresponds uniquely to a particular one of the destinations 111 accessed via a corresponding destination port 113.

The command processing unit 102 is a control interface through which information regarding size and direction of data transfer and control for data processing is received and processed. The control for data processing includes, but is not restricted to, data deletion. The command for data transfer may be received from any initiator. The information regarding size and direction of data transfer and control is called one unit of command. The command for data transfer from an initiator may be processed in a command register pipeline in the command processing unit 102. Each destination may have a command register pipeline dedicated to it. The command register pipeline may have multiple stages and the command for data transfer may be processed in each stage of the command register pipeline.

The read request generator 104 generates one or more read requests for the command for data transfer with information such as address, validity, and amount of data required by the destination. The read request generator 104 generates the request based on instructions from the command processing unit 102. The one or more requests are sent to a corresponding data source 107 via a corresponding source port 106, and the source port 106 receives resulting data from the data source 107. The transfer of the data may further depend upon a proprietary scheduling scheme. The data source 107 transfers data either in an in-order method—a method in which data for the read requests are sent in an order in which the read requests are received at the data source 107—or in an out-of-order method—a method in which data for the read requests are sent in any manner without consideration of the order in which the read requests are received at the data source 107.

The data sent by the data source 107 and received via the corresponding source port 106 is received by the data processing unit 108 which handles processing of the data. The data processing unit 108 may include multiple data register pipelines each of which corresponds to a particular combination of source and destination. Each data register pipeline may include multiple stages inside which the data is processed. The number of stages may be fixed or variable. The processed data from the data register pipeline is written to a corresponding buffer 110 which corresponds to the source-destination combination.

The buffers 110 temporarily store the data from the data processing unit 108 that is to be transferred to the corresponding destination port 113. The buffers 110 store data until the corresponding destination ports are ready to accept the data. The transfer control unit 112 schedules transfer of the data from the buffers 110 to their corresponding destinations 111 based on a process request from the buffers 110 and the status of the corresponding destinations 111.

The buffers 110 may be implemented in RAM, and in such case may be referenced as a RAM buffer. Each RAM buffer may have one or more power saving modes wherein the RAM consumes less power than it does when it is in an active mode. The power saving modes may include, but are not limited to, a light sleep mode, a deep sleep mode, and a power gating mode.

In the light sleep mode, a memory state of the RAM is retained, and the RAM has a low sleep entry time—i.e., time taken to switch from the active mode to a sleep mode after a power saving enter command is asserted to the RAM—and a low sleep exit time—i.e., time taken to switch from the sleep mode to the active mode after a power saving exit command is asserted to the RAM. In the light sleep mode, the RAM provides little power saving. In the deep sleep mode, the memory state of the RAM is retained but power to periphery of the RAM is switched off. In the deep sleep mode, the RAM has higher sleep entry and sleep exit times compared to that of light sleep mode, but provides better power saving when compared to the light sleep mode. In the power gating mode, power supplied to core and periphery is shut down and the memory state of the RAM is lost. As a result, in the power gating mode, the RAM has highest sleep entry and sleep exit times, and provides highest power saving compared to the light sleep and the deep sleep modes.

The light sleep mode, deep sleep mode, and the power gating mode are hereinafter referred to as power saving modes. The above mentioned power saving modes are just examples and may vary depending on vendor and technology of the RAM. For example, ARM™ 28 nm RAM has four modes namely "selective pre-charge", "RET1", "RET2", and "power gating".

In the multi-directional data transfer circuit 100, a total time taken from receiving a command for data transfer by the command processing unit 102 to reading of data may greater than a time for which a corresponding buffer 110 is required to be active for performing write and read operations. Thus, a RAM functioning as the corresponding buffer 110 may be maintained in a power saving mode for a significant amount of time of the read operation thereby achieving power saving.

Although utilization of the power saving modes of the RAM buffers in a multi-directional data transfer circuit can lead to power saving, in some cases it may lead to higher power consumption than usual. For example, the RAM buffer may switch to the power saving mode at a time instance at which all data corresponding to a command for data transfer are read out of it by the destination. In another example, the RAM buffer may switch to the power saving mode at a time instance at which all data corresponding to a read command are written to it. If, however, new data is to be written to the RAM buffer at these time instances due to a new command for data transfer, the RAM buffer has to switch back to the active mode again. A switching from the active mode to the power saving mode and immediately back to the active mode may cause a higher power consumption compared to the RAM buffer remaining in the active mode.

In addition to causing higher power consumption than usual in some cases, the power saving modes of the RAM buffers may also cause a delay in data transfer. For example, when the RAM buffer is in the power saving mode, the data source has to wait for the power saying exit time to elapse after the power exit command is applied to the RAM buffer to write data to it. This may cause delay in data transfer. Similar problems also occur in other types of the multi-directional data transfer, such as multi-source multi-directional data transfer, in which multiple sources send data to multiple destinations.

In order to avoid such higher power consumption and delay in data transfer, the power saving modes of the RAM buffers are often left unused, resulting in non-realization of power saving.

The present technique provides power saving in a multi-directional data transfer circuit 100. The technique utilizes the power saving modes of the RAM buffers to save power. The commands for data transfer for each source-destination pair are tracked and are accumulated before generating read requests using the read request generator 104 and reading the data corresponding to the read requests from the corresponding source 107. The commands for data transfer may be accumulated in the command processing unit 102. When an amount of data corresponding to the accumulated commands for data transfer for a source-destination pair is below a predefined threshold, the corresponding read requests are not yet generated and therefore data corresponding to the read requests are not yet read from the data source 107. In addition, the RAM buffer corresponding to the source-destination pair is maintained in the power saving mode. When the amount of data corresponding to the accumulated commands for data transfer for the source-destination pair surpasses the threshold, the read requests corresponding to the commands for data transfer may be generated and data corresponding to the read requests may be read from the data source 107. In addition, the RAM buffer corresponding to the destination may then be switched from the power saving mode to the active mode.

The accumulation of the commands for data transfer based on the amount of data corresponding to the commands for data transfer prevents immediate switching of the RAM buffer from the power saving mode to the active mode and vice-versa and further prevents maintenance of the RAM buffer in the active mode for a prolonged duration. This enables maintenance of the RAM buffer in the power saving mode for a longer duration, thereby achieving a greater power saving.

Although the embodiments described herein involve read commands, it will be understood that the present technique can be used with any other type of command, such as write commands.

When the amount of data corresponding to the commands for data transfer for the destination surpasses a predefined threshold, the destination is paired with the source to activate a source-destination pair, wherein activation designates a state of flow of commands in command pipeline stages or data in data processing pipeline stages. Activation of a source-destination pair may comprise causing the corresponding RAM buffer to enter an active mode, or likewise to exit a power saving mode. The source-destination pair is used for reading the data corresponding to the pending commands for data transfer from the data source 107. The source-destination pair remains active until all the data corresponding to the pending read commands are read from the data source 107 and may then be deactivated. Deactivation of the source-destination pair may comprise causing the corresponding buffer to enter a power saving mode.

Figure 3:
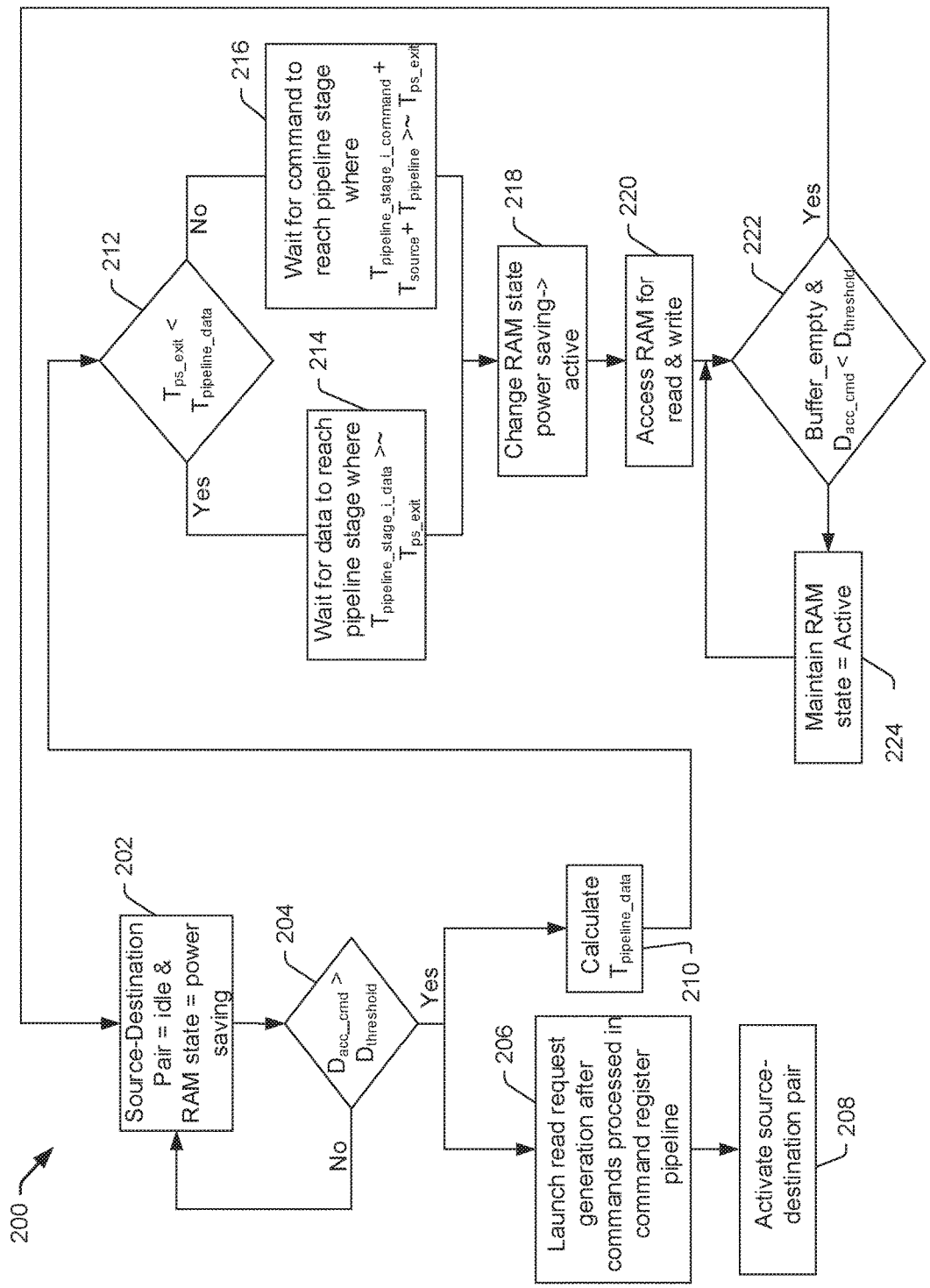
FIG. 3 is a flowchart illustrating a method of controlling a multi-directional data transfer circuit, in accordance with an aspect of the present disclosure.

FIG. 3 illustrates a method 200 of operating the multi-directional data transfer circuit 100, including switching of a RAM buffer 110 from the power saving mode to the active mode. Although the method 200 is illustrated and described with respect to a particular source-destination pair, it will be understood that an instance of the method 200 may be performed with respect to each source-destination pair of the circuit 100.

As shown in FIG. 3, initially, at 202, the source-destination pair is maintained in an idle state and the corresponding RAM buffer is maintained in the power saving mode. At 204, it is checked whether the amount of data $D_{acc\_cmd}$ corresponding to the pending commands for data transfer for the source-destination pair is greater than a predefined threshold $D_{threshold}$.

The predefined threshold may be a configurable value and may be configured to ensure an optimal trade-off between power saving and delay in servicing of read requests due to accumulation of the commands for data transfer. The amount of data corresponding to the pending commands for data transfer may be counted using a counter which increments a count by the amount of data to be read for a command for data transfer each time a new command for data transfer is received from the initiator. The counter may be provisioned in the command processing unit 102. The operation of the counter may be symbolically represented as follows:

$$D_{acc\_cmd}=Ci,sdi?(D_{acc\_cmd}+Dci):Co,sid?(D_{acc\_cmd}-Dco):D_{acc\_cmd}$$

where, $D_{acc\_cmd}$ represents the amount of pending data for a source-destination pair sdi, Ci,sdi represents a command received from initiator for source(s)-destination(s) data transfer, Co,sdi represents a launched read command for data transfer from source s to destination d, Dci represents amount of data to be read for the incoming command for data transfer, and Dco represents amount of data read from the source 107 corresponding to the launched read command. When the incoming command for data transfer arrives, the counter is incremented by the amount of data, Dci, to be read for the incoming read command. The counter may be incremented when the incoming command for data transfer is received at a first stage of the command register pipeline. When data is sent from the source for the pending read command, the counter is decremented by the amount of data sent for the pending read command, Dco.

If the amount of data corresponding to the pending commands for data transfer for the source-destination pair is less than the predefined threshold, the source-destination pair is maintained in the idle state and the corresponding RAM buffer is maintained in the power saving mode. If the amount of data corresponding to the pending commands for data transfer for the source-destination pair is greater than the threshold, at 206, read request generation is launched so that read requests corresponding to the pending commands for data transfer may be generated and data corresponding to the read requests may be read from the source 107. The read requests for the pending commands are generated after the commands for the data transfer are processed in the command register pipeline. At 208, the generation of the read request activates the source-destination pair. Once the source-destination pair is activated, it remains activated till all data corresponding to the pending commands for data transfer for the source-destination pair are written to the destination. The launching of the read request may be symbolically represented as follows:

$$R\_Dlaunch,sdi=(D_{acc\_cmd}>D_{threshold});$$

where, R_Dlaunch,sdi represents the launching of the read request for a source-destination pair sdi, $D_{acc\_cmd}$ represents amount of data corresponding to pending commands for data transfer for the source-destination pair sdi, and $D_{threshold}$ represents threshold for RAM buffer corresponding to the source-destination pair sdi.

As explained earlier, the read data from the data source 107 passes through one or more data register pipelines in the data processing unit 108 corresponding to the destination before reaching the corresponding RAM buffer 110. The processing of the data in the data register pipeline consumes a certain amount of time which depends on the number of stages in the register pipelines. For example, the data may be processed for one clock cycle for each pipeline stage of the data register pipeline. Therefore, at 210, a time $T_{pipeline\_data}$ required for the processing of the data in the data register pipeline is calculated, which may be based on the number of pipeline stages in the data register pipeline.

Since the data is written to the RAM buffer only after it is processed in the register pipeline stages, the switching of the RAM buffer from the power saving mode to the active mode may be performed based on the amount of time taken for the processing of the data in the register pipeline stages. Therefore, at 212, the data register pipeline processing time $T_{pipeline\_data}$ is compared with the power saving exit time $T_{ps\_exit}$ for the RAM buffer, being the amount of time required for the RAM buffer to exit the power saving mode. If $T_{pipeline\_data}$ is greater than $T_{ps\_exit}$, at 214, the assertion of a power saving exit command to the RAM buffer is delayed until a time at which the data has reached a data register pipeline stage i from which the time for the data to reach the RAM buffer, denoted as $T_{pipeline\_stage\_i\_data}$, is equal to, or slightly greater than, $T_{ps\_exit}$. For example, the power saving exit command may be asserted when $T_{pipeline\_stage\_i\_data} = T_{ps\_exit}$=a predetermined number of clock cycles. Alternatively, the power saving exit command may be asserted when $T_{pipeline\_stage\_i\_data} = T_{ps\_exit} + N$, wherein N equals a preconfigured number of clock cycles. The assertion of the power saving exit command may be symbolically represented as below:

$$PS_{exit,i} = (D_{acc\_cmd} > D_{threshold})(T_{pipeline\_stage\_i\_data} \gtrsim T_{ps\_exit});$$

where $PS_{exit,i}$ represents power saving exit command for the RAM buffer corresponding to the source-destination pair sdi and $D_{acc\_cmd}$ represents the amount of pending data corresponding to the source-destination pair sdi.

If, at 212, it is determined that $T_{pipeline\_data}$ is less than $T_{ps\_exit}$, then the RAM buffer cannot be switched from the power saving mode to the active mode before the data reaches the RAM buffer even if the power saving exit command is asserted when the data is at the first stage of the register pipeline. Thus, to ensure switching of the RAM buffer to the active mode when the data reaches it, the power saving exit command may be asserted to the RAM buffer before the processing of the data in the data register pipeline. Thus, the power saving exit command may be asserted to the RAM buffer when the command for data transfer is in the command register pipeline. When the power saving exit command is asserted to the RAM buffer while the command for data transfer is in a command register pipeline stage, the data reaches the RAM buffer after a time period of $T_{pipeline\_stage\_i\_command} + T_{source} + T_{pipeline\_data}$, where $T_{pipeline\_stage\_i\_command}$ is the time taken by the command for data transfer to reach the last stage in the command register pipeline from a stage i in the command register pipeline, $T_{source}$ is the time taken by the data source 107 in sending data corresponding to the pending commands for data transfer to the data register pipeline. Since the time taken for the data to reach the RAM buffer from a time at which the command for data transfer is at a command pipeline stage i is $T_{pipeline\_stage\_i\_command} + T_{source} + T_{pipeline}$, at 216, a pipeline stage i is determined such that $T_{pipeline\_stage\_i\_command} + T_{source} + T_{pipeline}$ is equal to, or slightly greater than $T_{ps\_exit}$. For example, the power saving exit command may be asserted when $T_{pipeline\_stage\_i\_command} + T_{source} + T_{pipeline} = T_{ps\_exit}$=a predetermined number of clock cycles. Alternatively, the power saving exit command may be asserted when $T_{pipeline\_stage\_i\_command} + T_{source} + T_{pipeline} = T_{ps\_exit} + N$, wherein N equals a preconfigured number of clock cycles. When the command for data transfer reaches the determined pipeline stage i, the power saving exit command is asserted to the RAM buffer.

In other words, a time instance for assertion of the power saving exit command to the RAM buffer is selected based in part on the time taken by the command for data transfer to reach the final stage in the command register pipeline. Thus, by utilizing the time taken for the command processing in the command register pipelines for switching the RAM buffer to the active mode, it is ensured that the RAM buffer is in the active mode when the data is available at its head for being written to it and thus, no data is lost due to the switching of the RAM buffer to the active mode.

At 218, the power saving exit command is asserted to the RAM buffer at a time instance based on determination at 214 or 216, so that the RAM buffer switches to the active mode after time $T_{ps\_exit}$. Thereafter, at 220, after the RAM buffer switches to the active mode, the RAM buffer is accessed for writing data to and reading out data from it. The RAM buffer is maintained in the active mode until data corresponding to all pending commands for data transfer are written to the destination. At 222, it is checked whether the RAM buffer is empty. The RAM buffer becomes empty when the source stops writing data to it and the destination reads out all the data written to it. The emptiness of the RAM buffer may be determined by tracking the RAM buffer by the source or the destination, or both. For this purpose, the low-power controller logic may receive a status signal from the destination 111 or an empty signal from the buffer 110. At 222, it is also checked whether the amount of data corresponding to the pending commands for data transfer is less than the threshold. If both the checks at 222 yields a positive result, the RAM buffer is switched to the power saving mode by asserting the power saving enter command, and the source-destination pair is deactivated. If either of the checks at 222 yields a negative result, at 224, the RAM buffer is maintained in the active mode. The checks performed at 222 may be symbolically represented as below:

$$PS_{enter,i} = (Di = 0)(D_{acc\_cmd} < D_{threshold});$$

where $PS_{enter,i}$ represents the power saving enter command for the RAM buffer corresponding to the source-destination pair sdi, Di represents amount of data in the RAM buffer corresponding to the source-destination pair sdi.

Although FIG. 3 is described with reference to a data source 106 servicing read commands from one destination, other embodiments are possible such as where the one or more data sources 107 services read commands from multiple destinations 111, wherein data transfer circuit 100 possesses a buffer 110 associated with each unique source 107, destination 111 pair, and performs the method 200 independently with respect to each source 107, destination 111 pair.

Figure 4:
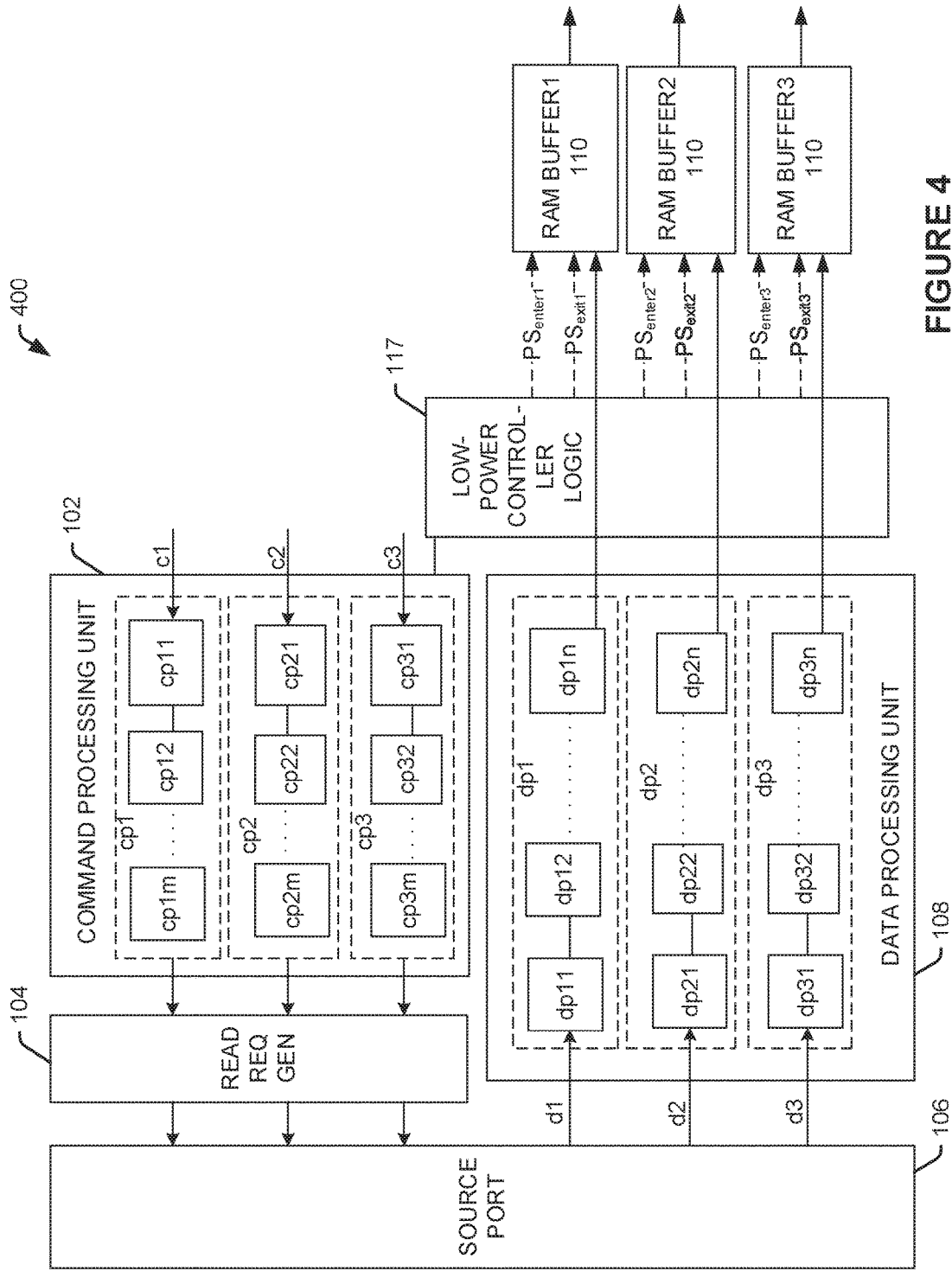
FIG. 4 is a block diagram illustrating generation of power saving enter commands and power saving exit commands for multiple data paths corresponding to multiple source-destination pairs, in accordance with an aspect of the present disclosure.

As discussed above, the low-power controller logic 117 may determine when to assert power saving exit and entry signals to the buffers 110 based on an expected amount of time for commands to traverse command register pipelines in the command processing unit 102 and/or data register pipelines in the data processing unit 108 corresponding to the particular source-destination pair. FIG. 4 shows a portion 400 of an embodiment of the circuit 100 isolating the command processing unit 102, the read command generator 104, the source port 106, the data processing unit 108, the low-power controller logic 117, and the buffers 110. For the sake of clear illustration, only a single source port 106 is shown and discussed, but it will be understood that the principles and techniques involved are equally applicable to each of a number of source ports 106 and corresponding sources 107.

With reference to FIG. 4, data paths d1, d2, d3 correspond to source-destination pairs sd1, sd2, and sd3, respectively. The commands for data transfer c1, c2, and c3 are received from the destinations 1, 2, and 3 respectively by the command processing unit 102. The commands for data transfer received from the destinations are tracked by a command tracker (not shown) which may be provisioned inside the command processing unit 102, or may be a separate component. The command processing unit 102 determines an amount of data required for each of the read commands. In addition, the command processing unit 102 also processes the commands for data transfer in command register pipelines. The command register pipelines corresponding to the destinations 1, 2, and 3 are represented as cp1, cp2, and cp3 respectively. The command register pipelines may have multiple stages inside which the commands for data transfer are processed. For example, cp1 has stages cp11, cp12, . . . , cp1$m$ in which the commands for data transfer from the destination 1 are processed. Although the command register pipelines cp1, cp2, and cp3 are shown to have same number of pipeline stages, it will be understood that different command register pipelines may have different number of pipeline stages.

As explained earlier, the commands for data transfer may be accumulated until the amount of data corresponding to the pending commands for data transfer for a destination is greater than the threshold. When the amount of data corresponding to the pending commands for data transfer for a destination is greater than its threshold, read commands corresponding to the pending commands for data transfer are generated by the read command generator 104 so that data required by the destination is sent from the source 106 to a corresponding data register pipeline. The data register pipelines for the destinations 1, 2, and 3 are represented as dp1, dp2, and dp3 respectively. The data register pipelines may have multiple pipeline stages. For example, dp1 has stages dp11, dp12, . . . , dp1$n$. Although the data register pipelines dp1, dp2, and dp3 are shown to have same number of pipeline stages, it will be understood that different data register pipelines may have different number of pipeline stages.

The low power controller logic 117 generates power saving exit commands for the RAM buffers based on their power saving entry time, power saving exit time, number of stages in the command register pipeline, number of stages in the data register pipeline, command register pipeline stage at which the command for data transfer is present and data register pipeline stage at which the data is present. The power saving exit commands for RAM buffers 1, 2, and 3 are represented by $PS_{exit1}$, $PS_{exit2}$, and $PS_{exit3}$ respectively. In addition, the low power controller logic 402 generates the power saving enter command for a RAM buffer when the RAM buffer is empty and the number of pending read commands for the RAM buffer is less than its threshold. The power saving enter commands for the RAM buffers 1, 2, and 3 are represented by $PS_{enter1}$, $PS_{enter2}$, and $PS_{enter3}$ respectively. Although FIG. 4 is explained with reference to the data source 106 servicing read commands from destinations, in other embodiments the data source 106 services write commands from multiple destinations.

Figure 5:
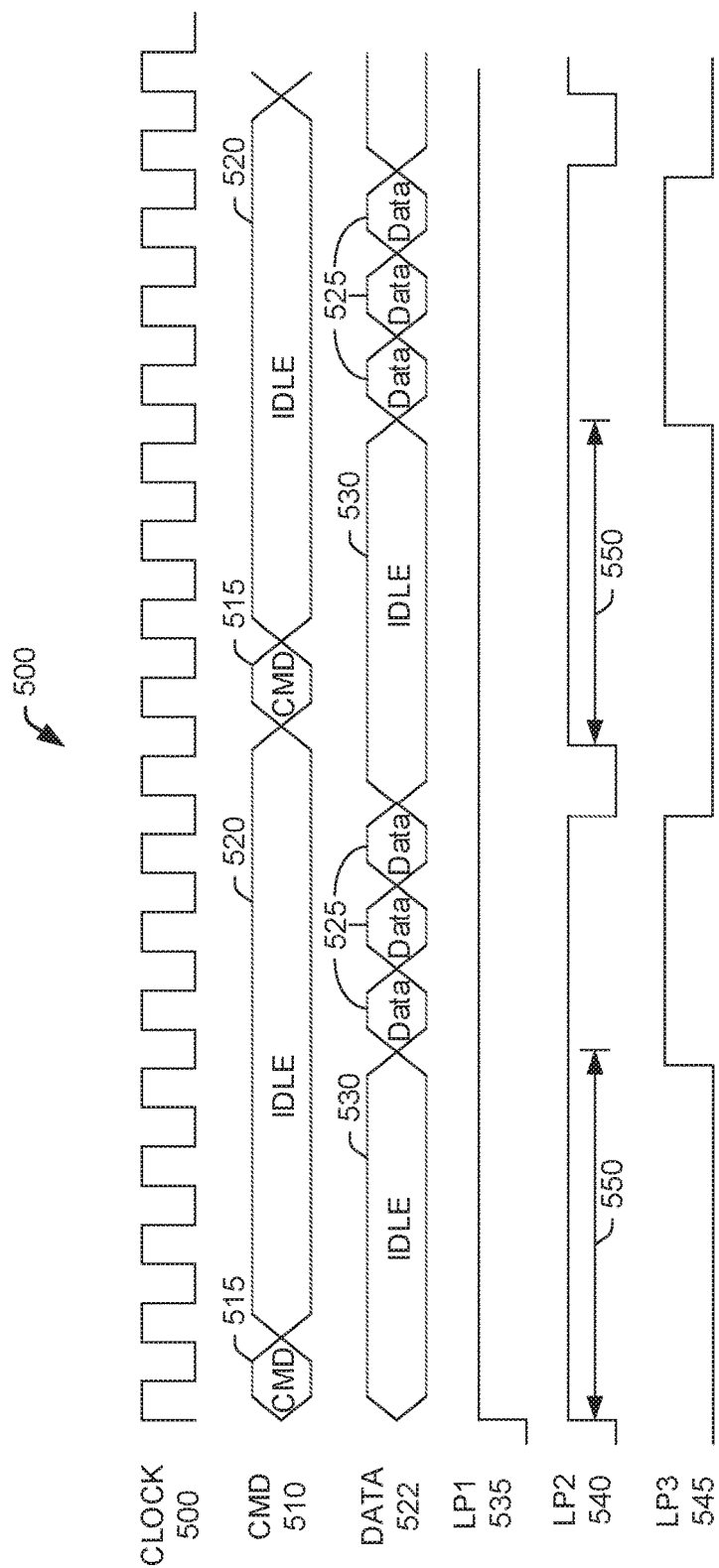
FIG. 5 is a timing diagram illustrating a comparison of power consumption of a RAM buffer operated based on different operating schemes.

FIG. 5 shows a timing diagram 500 comparing power consumption of a RAM buffer using various RAM buffer operating schemes, to illustrate the improved power saving achieved by the present techniques. The diagram 500 includes a clock track 505 illustrating a clock signal; a command track 510 illustrating the receipt of commands 515 and idle periods 520; a data track 522 illustrating the receipt of data 525 from a data source and idle periods 530; a first low-power mode track 535 illustrating low-power mode transitions according to a first scheme; a second low-power mode track 540 illustrating low-power mode transitions according to a second scheme; and a third low-power mode track 545 illustrating low-power mode transitions according to a third scheme.

Specifically, in the first scheme (LP1) illustrated by the first track 535, power-saving mode is not utilized, and it is shown that the signal remains high, signifying that the corresponding buffer is active, throughout. The second track 540 illustrates the second scheme (LP2) wherein the RAM buffer is switched from the active mode to the power saving mode and vice versa using a generic power saving scheme, and is entered into a low-power mode after writing of a last data segment 525, and is exited from the lower-power mode immediately upon receipt of a first command 515. Lastly, track 545 illustrates a third scheme (LP3) according to the present techniques, wherein the RAM buffer is entered into and exited from the power saving mode as described above.

By way of comparison, in the first scheme (LP1) shown in track 535, the RAM buffer remains in the active mode for the entire period of time and the power saving mode is not utilized. In the second scheme shown (LP2) shown in track 540, the RAM buffer operates under the generic power saving scheme, and the RAM buffer switches to the active mode as soon as a command 515 for data transfer is received and switches to the power saving mode only all data 525 written to it are read by the destination. This results in the RAM buffer remaining in the active mode for long durations of time, including during periods 550 when no data is being read from the data source. Finally, in the third scheme (LP3) shown in track 545 wherein the RAM buffer is operated according to embodiments of the present techniques, the RAM buffer is switched to the active mode only when data corresponding to the command for data transfer are processed in all pipeline stages of the data register pipeline and are ready to be written to the RAM buffer. This results in the RAM buffer remaining in the power saving mode for longer period of time. This enables achieving greater power savings compared to the first and the second RAM buffer operating schemes.

Thus, the present technique provides significant power savings compared to typical RAM buffer operating schemes, and can be used for achieving low power targets for storage and networking controller chips having plurality of interfaces such as Peripheral Component Interconnect (PCI), Double Data Rate (DDR), Ethernet, and internal memories involved in data transactions.

Without limitation, the following embodiments may be used.

Embodiment I

A power-saving method in a data processing device comprising a data buffer, the method comprising: receiving at the data processing device data transfer commands associated with a data source and a data destination, the data source and the data destination being associated with the data buffer of the data processing device; accumulating the data transfer commands at the data processing device until an amount of data associated with the data transfer commands is greater than a predefined threshold; when the amount of data is less than the predefined threshold and the data buffer is empty, signaling the data buffer to enter or to maintain a power saving mode; and when the amount of data is at least the predefined threshold, signaling the data buffer to exit the power saving mode following a predetermined delay.

Embodiment II

The power-saving method according to Embodiment I, wherein, when the amount of data is at least the predefined threshold and the data buffer is empty, the method further comprises: determining a data processing time of the data; and determining the delay based on the data processing time.

Embodiment III

The power-saving method according to Embodiment II, wherein determining the delay based on the data processing time comprises: comparing the data processing time to a power saving mode exit time of the power saving mode; if the power saving mode exit time is less than the data processing time: waiting until a remaining data processing time equals the power saving mode exit time plus a first preconfigured further time; if the power saving mode exit time is not less than the data processing time: waiting until a sum of: a remaining command processing time of the data transfer commands; a data transfer time of the data from the data source; and the data processing time, equals the power saving mode exit time plus a second preconfigured further time.

Embodiment IV

The power-saving method according to Embodiment III, wherein the first preconfigured further time and the second preconfigured further time each equals zero.

Embodiment V

The power-saving method according to Embodiment III, wherein the first preconfigured further time and the second preconfigured further time each equals a preconfigured number of clock cycles.

Embodiment VI

The power-saving method according to Embodiment III, wherein the determining of the data processing time of the data is based on a number of stages of a data register pipeline.

Embodiment VII

The power-saving method according to Embodiment VI, wherein waiting until the remaining data processing time equals the power saving mode exit time comprises waiting until the data reaches one of the stages of the data register pipeline such that the remaining data processing time equals the power saving mode exit time.

Embodiment VIII

The power-saving method according to Embodiment III, wherein the remaining command processing time of the data transfer commands is based on a remaining number of stages of a command register pipeline.

Embodiment IX

The power-saving method according to Embodiment VIII, wherein waiting until the sum is equal to the power saving mode exit time comprises waiting until the data transfer commands reach one of the stages of the command register pipeline such that the sum equals the power saving mode exit time.

Embodiment X

The power-saving method according to Embodiment I, further comprising, when the amount of data is at least the predefined threshold, launching generation of at least one data transfer request for the data from the data source.

Embodiment XI

The power-saving method according to Embodiment X, wherein launching the at least one data transfer request comprises processing the data transfer commands in a command register pipeline to generate processed data transfer commands, generating the at least one data transfer request based on the processed data transfer commands, and transmitting the at least one data transfer request to a source port of the data processing device, the source port being associated with the data source.

Embodiment XII

A data transfer circuit comprising: a command processing unit to receive data transfer commands, and to accumulate the data transfer commands until an amount of data associated with the data transfer commands is greater than a predefined threshold; a source port connected to receive at least one data transfer request based on the data transfer commands, the source port interfacing a data source to receive data based on the at least one read request; a data processing unit connected to the source port to receive the data and to process the data to generate processed data; a data buffer connected to the data processing unit to buffer the processed data; a destination port connected to the data buffer and interfacing the data destination to transmit the processed data from the data buffer to the data destination; and a low-power controller logic connected to the command processing unit, the data processing unit, and the data buffer: when the amount of data is less than the predefined threshold and the data buffer is empty, to signal the data buffer to enter or to maintain a power saving mode; and when the amount of data is at least the predefined threshold, to signal the data buffer to exit the power saving mode following a predetermined delay.

Embodiment XIII

The data transfer circuit according to Embodiment XII, wherein the low-power controller logic is further configured, when the amount of data is at least the predefined threshold and the data buffer is empty: to determine a data processing time of the data by the data processing unit; and to determine the delay based on the data processing time.

Embodiment XIV

The data transfer circuit according to Embodiment XIII, wherein the low-power controller logic delays the signaling of the data buffer to exit the power saving mode based on the data processing time by: comparing the data processing time to a power saving mode exit time of the power saving mode; if the power saving mode exit time is less than the data processing time: waiting until a remaining data processing time equals the power saving mode exit time plus a first preconfigured further time; if the power saving mode exit time is not less than the data processing time: waiting until a sum of: a remaining command processing time of the data transfer commands; a data read transfer time of the data from the data source; and the data processing time, equals the power saving mode exit time plus a second preconfigured further time.

Embodiment XV

The data transfer circuit according to Embodiment XIV, wherein the first preconfigured further time and the second preconfigured further time each equals zero.

Embodiment XVI

The data transfer circuit according to Embodiment XIV, wherein the first preconfigured further time and the second preconfigured further time each equals a preconfigured number of clock cycles.

Embodiment XVII

The data transfer circuit according to Embodiment XIV, wherein the data processing unit comprises a data register pipeline comprising a number of stages, and the low-power controller logic determines the data processing time of the data based on the number of stages of the data register pipeline.

Embodiment XVIII

The data transfer circuit according to Embodiment XVII, wherein waiting until the remaining data processing time equals the power saving mode exit time comprises waiting until the data reaches one of the stages of the data register pipeline such that the remaining data processing time equals the power saving mode exit time.

Embodiment XIX

The data transfer circuit according to Embodiment XIV, wherein the command processing unit comprises a command register pipeline comprising a number of stages, and the low-power controller logic determines the remaining command processing time of the data transfer commands based on a remaining number of the stages of the command register pipeline.

Embodiment XX

The data transfer circuit according to Embodiment XIX, wherein the low-power controller logic waits until the sum is equal to the power saving mode exit time by waiting until the data transfer commands reach one of the stages of the command register pipeline such that the sum is equal to the power saving mode exit time.

Embodiment XXI

The data transfer circuit according to Embodiment XII, wherein the low-power controller logic is further configured to cause the command processing unit to launch generation of at least one data transfer request for the data from the data source when the amount of data is at least the predefined threshold.

Embodiment XXII

The data transfer circuit according to Embodiment XXI further comprising a data transfer request generator connected to the command processing unit and the source port, wherein the command processing unit comprises a command register pipeline, wherein the command processing unit processes the data transfer commands in the command register pipeline to generated processed data transfer commands, and the data transfer request generator generates the at least one data transfer request based on the processed data transfer commands and transmits the at least one data transfer request to the source port.

Embodiment XXIII

The data transfer circuit according to Embodiment XXII, wherein the source port comprises a peripheral component interconnect (PCI) source port, an on-chip shared memory source port, or a double data rate (DDR) bus source port.

Embodiment XXIV

The data transfer circuit according to Embodiment XXII, wherein the destination port comprises a PCI destination port, an on-chip shared memory source port, or a double data rate (DDR) bus source port.

Embodiment XXV

The power-saving method according to Embodiment I, wherein the data transfer commands comprise read commands.

Embodiment XXVI

The data transfer circuit according to Embodiment XII, wherein the data transfer commands comprise read commands.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A power-saving method in a data processing device comprising a data buffer, the method comprising:
   receiving at the data processing device data transfer commands associated with a data source and a data destination, the data source and the data destination being associated with the data buffer of the data processing device;
   accumulating the data transfer commands at the data processing device until an amount of data associated with the data transfer commands is greater than a predefined threshold;
   when the amount of data is less than the predefined threshold and the data buffer is empty, signaling the data buffer to enter or to maintain a power saving mode; and
   when the amount of data is at least the predefined threshold, signaling the data buffer to exit the power saving mode following a predetermined delay.

2. The power-saving method according to claim 1, wherein, when the amount of data is at least the predefined threshold and the data buffer is empty, the method further comprises: determining a data processing time of the data; and delaying the signaling of the data buffer to exit the power saving mode and determining the delay based on the data processing time.

3. The power-saving method according to claim 2, wherein determining the delay based on the data processing time comprises:
   comparing the data processing time to a power saving mode exit time of the power saving mode;
   if the power saving mode exit time is less than the data processing time:
      waiting until a remaining data processing time equals the power saving mode exit time plus a first preconfigured further time;
   if the power saving mode exit time is not less than the data processing time:
      waiting until a sum of:
         a remaining command processing time of the data transfer commands;
         a data transfer time of the data from the data source; and
         the data processing time,
      equals the power saving mode exit time plus a second preconfigured further time.

4. The power-saving method according to claim 3, wherein the first preconfigured further time and the second preconfigured further time each equals zero.

5. The power-saving method according to claim 3, wherein the first preconfigured further time and the second preconfigured further time each equals a preconfigured number of clock cycles.

6. The power-saving method according to claim 3, wherein the determining of the data processing time of the data comprises is based on a number of stages of a data register pipeline.

7. The power-saving method according to claim 6, wherein waiting until the remaining data processing time equals the power saving mode exit time comprises waiting until the data reaches one of the stages of the data register pipeline such that the remaining data processing time equals the power saving mode exit time.

8. The power-saving method according to claim 3, wherein the remaining command processing time of the data transfer commands is based on a remaining number of stages of a command register pipeline.

9. The power-saving method according to claim 8, wherein waiting until the sum is equal to the power saving mode exit time comprises waiting until the data transfer commands reach one of the stages of the command register pipeline such that the sum equals the power saving mode exit time.

10. The power-saving method according to claim 1, further comprising, when the amount of data is at least the predefined threshold, launching generation of at least one data transfer request for the data from the data source.

11. The power-saving method according to claim 10, wherein launching the at least one data transfer request comprises processing the data transfer commands in a command register pipeline to generate processed data transfer commands, generating the at least one data transfer request based on the processed data transfer commands, and transmitting the at least one data transfer request to a source port of the data processing device, the source port being associated with the data source.

12. The power-saving method according to claim 1, wherein the data transfer commands comprise read commands.

13. A data transfer circuit comprising:
   a command processing unit to receive data transfer commands and to accumulate the data transfer commands until an amount of data associated with the data transfer commands is greater than a predefined threshold;
   a source port connected to receive at least one data transfer request based on the data transfer commands, the source port interfacing a data source to receive data based on the at least one data transfer request;
   a data processing unit connected to the source port to receive the data and to process the data to generate processed data;
   a data buffer connected to the data processing unit to buffer the processed data;
   a destination port connected to the data buffer and interfacing the data destination to transmit the processed data from the data buffer to the data destination; and
   a low-power controller logic connected to the command processing unit, the data processing unit, and the data buffer:
      when the amount of data is less than the predefined threshold and the data buffer is empty, to signal the data buffer to enter or to maintain a power saying mode; and
      when the amount of data is at least the predefined threshold, to signal the data buffer to exit the power saving mode following a predetermined delay.

14. The data transfer circuit according to claim 13, wherein the low-power controller logic is further configured, when the amount of data is at least the predefined threshold and the data buffer is empty: to determine a data processing time of the data by the data processing unit; and to delay the signaling of the data buffer to exit the power saving mode and to determine the delay based on the data processing time.

15. The data transfer circuit according to claim 14, wherein the low-power controller logic determines the delay based on the data processing time by:
   comparing the data processing time to a power saving mode exit time of the power saving mode;

if the power saving mode exit time is less than the data processing time:
   waiting until a remaining data processing time equals the power saving mode exit time plus a first preconfigured further time;

if the power saving mode exit time is not less than the data processing time:
   waiting until a sum of:
      a remaining command processing time of the data transfer commands;
      a data transfer time of the data from the data source; and
      the data processing time,
   equals the power saving mode exit time plus a second preconfigured further time.

16. The data transfer circuit according to claim 15, wherein the first preconfigured further time and the second preconfigured further time each equals zero.

17. The data transfer circuit according to claim 15, wherein the first preconfigured further time and the second preconfigured further time each equals a preconfigured number of clock cycles.

18. The data transfer circuit according to claim 15, wherein the data processing unit comprises a data register pipeline comprising a number of stages, and the low-power controller logic determines the data processing time of the data based on the number of stages of the data register pipeline.

19. The data transfer circuit according to claim 18, wherein waiting until the remaining data processing time equals the power saving mode exit time comprises waiting until the data reaches one of the stages of the data register pipeline such that the remaining data processing time equals the power saving mode exit time.

20. The data transfer circuit according to claim 15, wherein the command processing unit comprises a command register pipeline comprising a number of stages, and the low-power controller logic determines the remaining command processing time of the data transfer commands based on a remaining number of the stages of the command register pipeline.

21. The data transfer circuit according to claim 20, wherein the low-power controller logic waits until the sum is equal to the power saving mode exit time by waiting until the data transfer commands reach one of the stages of the command register pipeline such that the sum is equal to the power saving mode exit time.

22. The data transfer circuit according to claim 13, wherein the low-power controller logic is further configured to cause the command processing unit to launch generation of at least one data transfer request for the data from the data source when the amount of data is at least the predefined threshold.

23. The data transfer circuit according to claim 22 further comprising a data transfer request generator connected to the command processing unit and the source port, wherein the command processing unit comprises a command register pipeline, wherein the command processing unit processes the data transfer commands in the command register pipeline to generated processed read commands, and the data transfer request generator generates the at least one data transfer request based on the processed data transfer commands and transmits the at least one data transfer request to the source port.

24. The data transfer circuit according to claim 13, wherein the source port comprises a peripheral component interconnect (PCI) source port, an on-chip shared memory source port, or a double data rate (DDR) bus source port.

25. The data transfer circuit according to claim 13, wherein the destination port comprises a PCI destination port, an on-chip shared memory source port, or a double data rate (DDR) bus source port.

26. The data transfer circuit according to claim 13, wherein the data transfer commands comprise read commands.

* * * * *